Sept. 24, 1957 W. A. PARDEE 2,807,231
APPARATUS FOR PREPARING CARBON IMPREGNATED SOLIDS
Filed Dec. 23, 1954 2 Sheets-Sheet 1
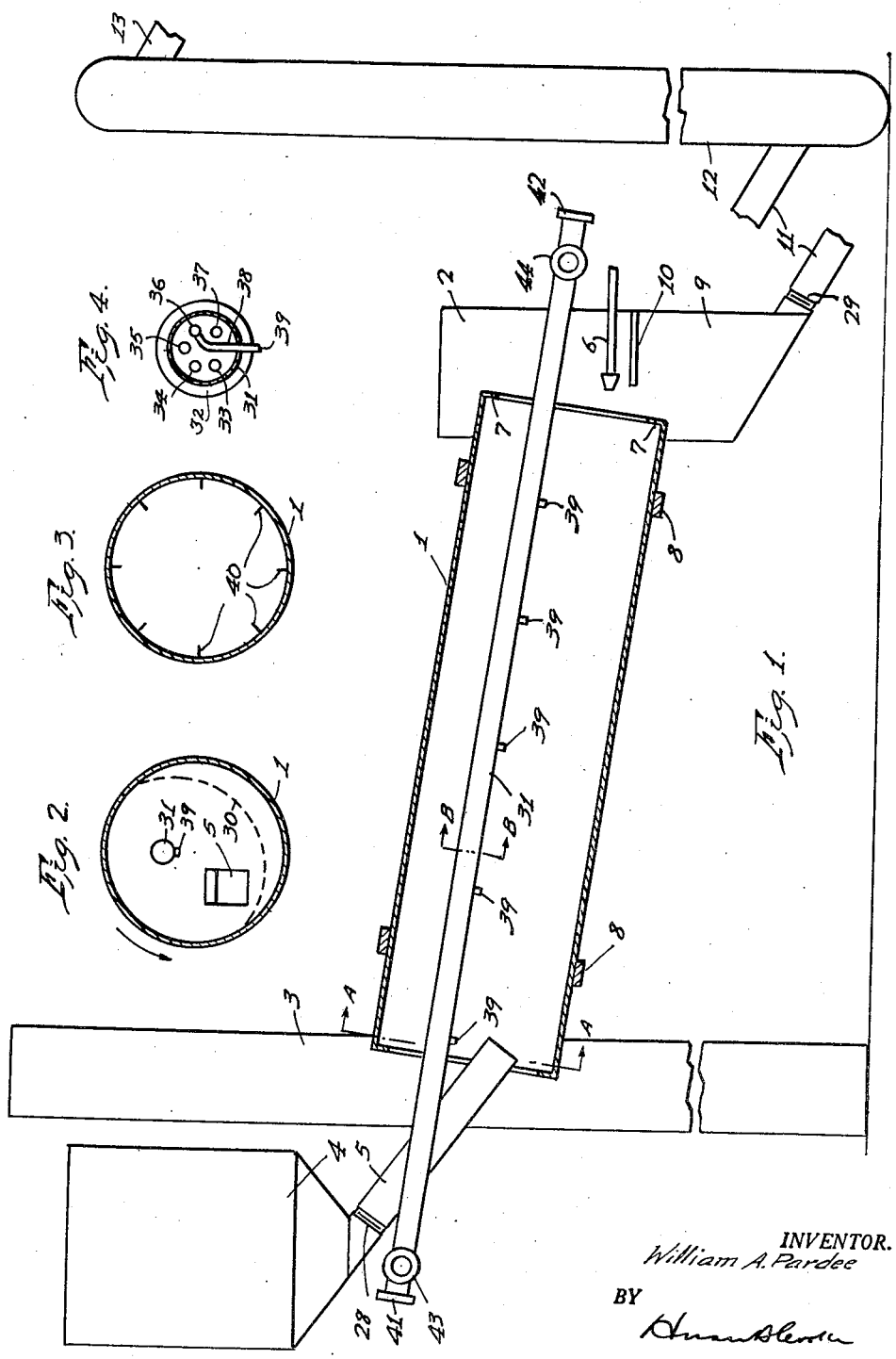
INVENTOR.
William A. Pardee
BY
ATTORNEY Sept. 24, 1957 W. A. PARDEE 2,807,231
APPARATUS FOR PREPARING CARBON IMPREGNATED SOLIDS
Filed Dec. 23, 1954 2 Sheets-Sheet 2

INVENTOR.
William A. Pardee
BY
ATTORNEY

United States Patent Office 2,807,231
Patented Sept. 24, 1957

2,807,231

APPARATUS FOR PREPARING CARBON IMPREGNATED SOLIDS

William A. Pardee, Fox Chapel, Pa., assignor to Gulf Research & Development Company, Pittsburgh, Pa., a corporation of Delaware Application December 23, 1954, Serial No. 477,303

4 Claims. (Cl. 118—47)

This invention relates to apparatus for preparing carbon impregnated solids and more particularly to an apparatus comprising a horizontal rotary kiln; a furnace chamber wherein fuel is burned and from which the combustion gases flow into the kiln, thereby heating the kiln and the contents thereof; a flue at the end of the kiln opposite the end at which the furnace chamber is located, and into which the spent combustion gases and any vapors generated in the kiln are discharged; a means for charging material-to-be-processed into the kiln; a chamber to receive processed material; and means for introducing asphalt to the material being processed at a number of separate points during its progress from the entrance end of the kiln to the discharge end of the kiln.

Many materials, particularly in the chemical industry, are required in a form in which they are in intimate admixture and contact with carbon. This is particularly true in the case of oxides which are to be reduced. Oxide ores such as aluminum oxide, titanium oxide, zirconium oxide, etc., are good examples.

In the processes commonly used for the large scale reduction of oxides, the oxide and carbon are usually mixed together and subjected to heat. The individual particles of oxide and of carbon as commonly processed are often of a size several inches in diameter, and in some cases they are broken down to a size of the order of one hundredth of an inch. These particles are sometimes in loose admixture and sometimes are briquetted together. I have found the materials to be much more reactive, and reactive at a lower temperature, if the oxide and the carbon are in more intimate mixture and contact such as is produced by saturating an absorbent oxide with asphalt and then carbonizing the asphalt in the pores of the oxide at high temperature. This impregnation of an oxide ore or other oxide with carbon is effected by introducing the oxide in relatively finely divided form into a heated rotary kiln in which it is heated and at least partially saturated with asphalt which will flow at the kiln temperature, by continuing the heating of the oxide and asphalt mixture (herein sometimes referred to as material-in-process) to a point at which the asphalt is at least partially coked, by adding further asphalt to the material-in-process at a number of successive points during its progress through the rotary kiln and so spacing the points of asphalt introduction as to permit at least partial coking of each charge of asphalt prior to the introduction of the next such charge, the degree of coking between successive charges of asphalt being to a stage at which the material-in-process will not adhere to the walls of the kiln to such a degree as to prevent its further longitudinal travel therein.

The aggregate prepared in the manner just described can be discharged from the rotary kiln at any desired temperature, this being determined by the firing. It is then charged into other apparatus to be heated, chlorinated, or otherwise reduced.

I measure the charge of asphalt to deposit carbon in the pores of the oxide in the proportion requisite to reduce the specific oxide, and I find that an aggregate containing such a percentage of carbon is best prepared by adding and carbonizing the asphalt in a series of increments, each increment proportioned to add approximately three and one-half percent to eight percent of carbon to the oxide. These increments are advantageously proportioned with the lower percentages at the cooler end of the horizontal rotary kiln and the higher percentages at the hotter end of the kiln. Also the spacing of the points at which successive increments are introduced is advantageously somewhat greater at the cooler end of the kiln than at the hotter end of the kiln because the partially cooled gases require more time, and therefore more kiln length, to accomplish the carbonization than do the hotter gases at the furnace end of the kiln.

The asphalt used in this process may vary over a wide range in characteristics but an asphalt of relatively high fixed carbon content is preferred for oxides of low porosity and an asphalt of relatively low melting point and low fixed carbon for oxides of high porosity. I have successfully used vacuum tower residuums of Baxterville (Mississippi) crude, vacuum tower bottoms from the running of mixed west Texas crude, eastern Venezuela vis-broken petroleum pitch and lighter asphalts. The Baxterville residuums ranged from a 33% residuum with 37.5% carbon residue and 267° F. softening point (ASTM Method D36) to an 18% residuum with 55% carbon residue and 440° F. softening point. The west Texas vacuum tower bottoms had a 17% carbon residue and a softening point of 88° F. The eastern Venezuela vis-broken petroleum pitch had a softening point of 350°– 360° F., 55% volatile matter, and 45% fixed carbon. When using asphalts with softening points of 200° F. and above it is practical to introduce the first portion of asphalt into the kiln with the oxide ore as discrete solid material.

I have invented a particularly effective and efficient device for continuously preparing carbon-impregnated oxides and other materials. This device is shown in the accompanying drawings.

Referring to the accompanying drawings Figure 1 is a cross section view of the rotary kiln and its related parts.

Figure 2 is a cross section view taken on A—A of Figure 1.

Figure 3 is a cross section view of the rotary kiln, showing a convenient style of longitudinal bars or "lifters" therein.

Figure 4 is a cross section view of element 31 and related parts, taken on B—B of Figure 1.

Figure 5:
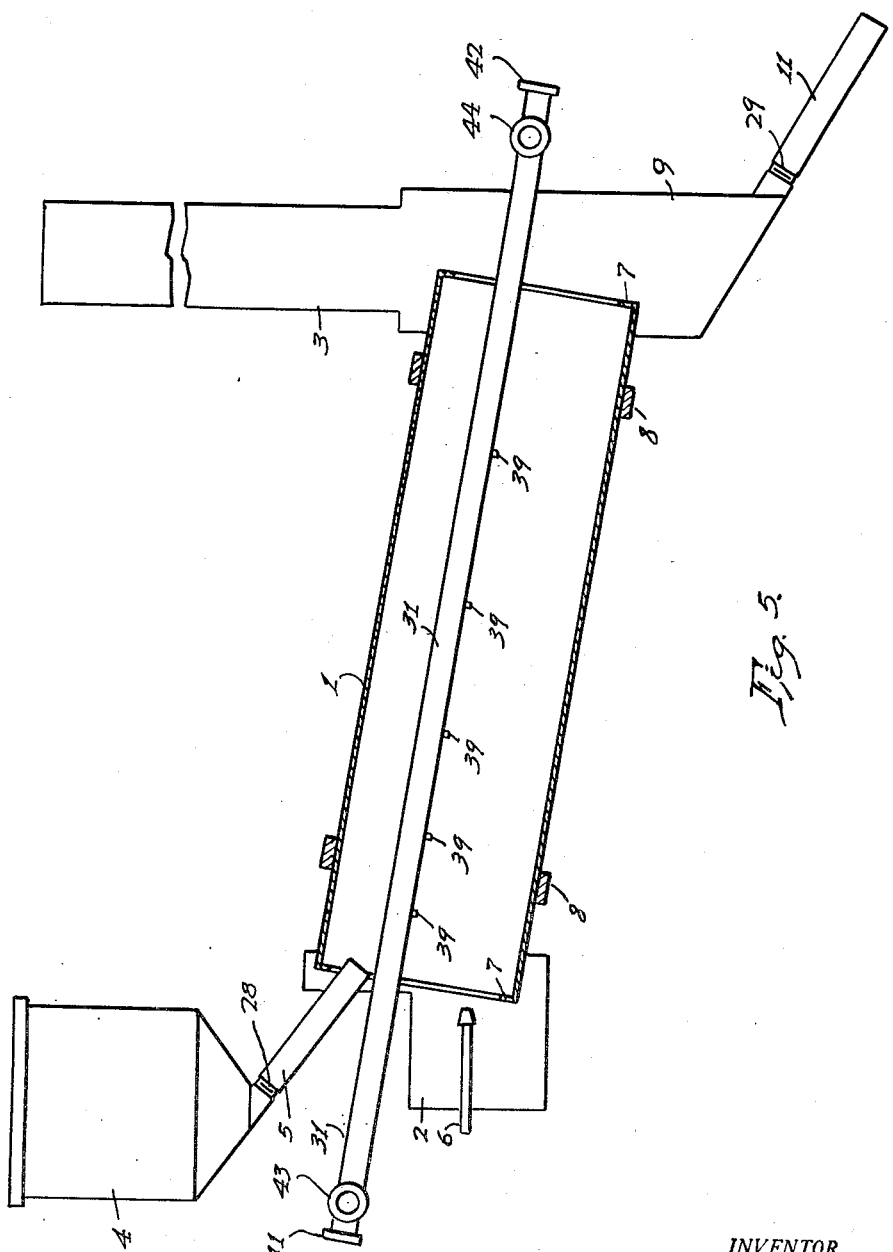
Figure 5 is a cross-section view of the rotary kiln and its related parts, showing the furnace and the stack at ends of the kiln opposite to those shown in Figure 1.

Referring to Figure 1, numeral 1 indicates a horizontal rotary kiln, extending from furnace chamber 2 at its lower end to stack 3 at its upper end. A raw material bin for material to be processed is indicated by numeral 4 and a chute 5 extends from the base of bin 4 into the upper (charging) end of kiln 1. Flow of material from bin 4 to kiln 1 is controlled by gate 28. The kiln is heated by burner 6, this burner being set back in furnace chamber 2 so that its flame will not ignite asphalt introduced, as hereinafter described, at the nearest nozzle 39. The kiln 1 discharges processed material at its lower end into receiving bin 9, which is separated from furnace chamber 2 by wall 10. A chute 11 extends from the base of receiving bin 9 to the base of elevator 12, and a gate 29 is provided to control the flow of material from bin 9 to elevator 12.

A jacketed conduit 31 extends through the entire length of horizontal rotary kiln 1, with its respective ends extending through and out beyond stack 3 and furnace chamber 2. It may be supported by the walls of these members 3 and 2 or by separate supports. Conduit 31 is fitted with a series of spray nozzles 39 and it carries in its interior a number of separate smaller conduits, 34 to 37 inclusive (subsequently described in connection with Figure 4), which extend from the individual spray nozzles to headers 41 and 42. Conduit 31 is also fitted with flanges 43 and 44 adjacent its respective ends to permit the introduction and circulation of steam or some other temperature controlling fluid in conduit 31 around the exterior of the aforementioned smaller conduits.

Referring to Figure 2, this is a cross section of the rotary kiln taken on section line A—A of Figure 1. Figure 2 shows the discharge end of chute 5 and it shows jacketed conduit 31. Conduit 31 is positioned with its longitudinal axis parallel to the longitudinal axis of horizontal rotary kiln 1, and its axis will be at a point high enough to spray liquid asphalt onto the contents of the kiln from nozzle 39. The longitudinal axis of jacketed line 31 may be positioned somewhat to the side of the vertical axis of the kiln 1 in order to avoid having the material-in-process fall upon it during rotation of the kiln. Numeral 30 identifies a dotted line depicting the approximate surface of the discrete material-in-process while the kiln is rotating in a contra-clockwise direction.

Figure 3 is a cross sectional view of kiln 1 showing the interior thereof fitted with a series of longitudinal ledges or "lifters" 40 to increase the agitation of discrete material-in-process during its progress through the kiln. These have some advantages in the hotter end of the kiln.

Figure 4 is a cross section of jacketed conduit 31, taken on section line B—B of Figure 1. In this view, numeral 31 indicates the metallic conduit and 32 indicates a heavy jacket of insulating material which entirely surrounds conduit 31. Numerals 33, 34, 35, 36, and 37 indicate a series of smaller separate conduits inside of conduit 31 which lead to individual spray nozzles 39 and which terminate at their other end at header 41 or 42, at which point they are connected to individual supply lines, not shown. The number of these smaller conduits is determined by the needs of the process as hereinafter discussed. Each of the conduits of the series 33 to 37 inclusive is connected to a spray nozzle 39 through a connection 38. Figure 4 shows the manner of the connection from smaller conduit 36 to its nozzle 39.

Figure 5 is a modification of the kiln shown in Figure 1. All the numbered parts of Figure 5 correspond to those of Figure 1, and the difference between the apparatus of Figure 1 and that of Figure 5 is that the furnace 2 and the stack 3 in Figure 5 are at ends of the kiln 1 opposite to those shown in Figure 1. In the apparatus of Figure 1 the material-in-process and the combustion gases flow countercurrent, while in the apparatus of Figure 5 the material-in-process and the combustion gases flow in the same direction.

In the use of my apparatus bin 4 is loaded with oxide, for example bauxite ore, of approximately half inch and less in size. There is advantage in having the oxide fairly fine. Kiln 1, rotated by means of gears 8, is put in operation. Burner 6 is ignited to provide the necessary heat for the operation. Ore from bin 4 is passed through chute 5 into horizontal rotary kiln 1. A gate 28 or star-valve or other device of similar function is positioned to control the flow of ore from bin 4 into kiln 1.

When the operation is well established and conditions have attained equilibrium the material being processed will discharge over flange 7 of kiln 1 into bin 9 at the desired temperature, this discharge temperature being controlled by the firing. In the case of bauxite the temperature is not ordinarily permitted to exceed approximately 1600° F. The material entering kiln 1 from bin 4 may be at atmospheric temperature or it may be at a somewhat elevated temperature. In the case of bauxite, previously uncalcined ore will produce a somewhat more reactive aggregate.

Asphalt to be sprayed on the ore during its passage through the kiln is charged through conduits 33, 34, 35, 36 and 37, all encased in conduit 31. This conduit 31 is exposed to the high temperature gases in kiln 1 and to prevent overheating and possible coking of the asphalt in conduits 33 to 37 inclusive two separate means of protection are provided. The first is heavy fireproof insulation 32 of minimum heat conductivity. The second is a continuous flow of steam or other temperature controlling fluid through the conduit 31. Flanges 43 and 44 are provided to receive and discharge the temperature controlling fluid. This temperature controlling fluid may be introduced at either end or it may with some advantage be conducted in a closed pipe inside conduit 31 to a point part way through the length of conduit 31 and discharged therefrom to both ends 43 and 44.

When my apparatus is designed for use which will produce a large quantity of hydrocarbon vapors in the kiln I may also enclose one or more air lines (not shown) in conduit 31 and introduce secondary air at various points along the length of the kiln for the combustion of these vapors.

It is desirable to be able to positively control the amount of asphalt introduced at each point of introduction, wherefore a separate pipe of the group 33 to 37 inclusive is provided for each spray nozzle 39. The separate pipes connect to either header 41 or header 42 and are there connected to lines from asphalt pumps. A separate line from a separate pump to each individual nozzle 39 permits volumetric control of the asphalt introduced at each nozzle 39 and also serves to reduce possibility of coking a portion of a line or coking a nozzle 39 as would occur much more readily if several nozzles were served by a single line and the asphalt were free to flow out through the channel of least resistance. To minimize the heating of asphalt in conduits 33 to 37 inclusive by the hot gases in the kiln it is advantageous to extend some of these lines inward from header 41 and some from header 42 according to the relative proximity to those headers of the individual terminal nozzle 39 and the severity of the heat in the section of the kiln that the conduit must pass through.

While the accompanying drawings show five asphalt charging conduits, 33 to 37 inclusive, it is not necessary that there be that specific number. The actual number in any particular installation may be greater or in some special cases somewhat less, according to the kiln temperatures and carbonizing characteristics of the asphalt. The actual number of points of introduction of asphalt along the length of the kiln should be sufficient to permit the individual increments of asphalt to be so limited in quantity that each individual increment will be promptly absorbed into the material-in-process and rapidly coked, thereby preventing the formation of a large sticky mass that would stick to the walls of the kiln.

The minimum amount of carbon required in an aggregate is that amount which will react with all of the combined oxygen of the ore to reduce the same. We have found that the required minimum of carbon to reduce all of the ore is an amount within the range of from 45 pounds of carbon up to 60 pounds of carbon per hundred pounds of oxygen in the dry ore. In the preparation of the aggregate it may be necessary to use more asphalt than that necessary to produce the above amount of carbon, this additional amount going to provide for three other sources of carbon consumption, viz.: burn-off of carbon in the kiln if excess air is present; burn-off of carbon in handling hot briquettes from kiln to subsequent processing apparatus; and burn-off in the final processing (e. g. chlorination) if air or oxygen is introduced at that stage to maintain the temperature of reaction or for other purposes. The magnitude of these three demands for carbon is determined exclusively by conditions of operation, which are within the control of the operator, and allowance should be provided according to need.

In a kiln which operates with the furnace gases flowing countercurrent to the material-in-process and with the gases leaving the kiln and entering the stack 3 at from 600° F. to 800° F., the maximum percentage of asphalt that can ordinarily be introduced at the stack end of the kiln is such as will add about three percent to five percent of carbon to the ore, measured after the asphalt is coked by the heat in the kiln. With a temperature of 1700° F. to 2000° F. for the furnace gases entering the kiln at the hot end, the maximum percentage of asphalt that can ordinarily be introduced from one nozzle close to that end is such as will add anywhere from about five percent to seven and one-half percent of carbon to the material-in-process. Quantities of asphalt intermediate the foregoing figures are introduced at the intermediate nozzles. The introduction of asphalt at the various nozzles in lesser quantities than those just stated is unobjectionable except that such practice may require a greater number of nozzles and even additional length of kiln. The introduction of asphalt at one point in greater quantity than can be promptly coked will produce a sticky mass that will not move longitudinally through the kiln and will seriously interfere with the operation.

The minimum amount of asphalt that should be introduced to produce a certain amount of carbon on the oxide being processed is susceptible of ready calculation from the fixed carbon content of the particular asphalt used, but that figure must be increased to allow for the carbon burned as a consequence of any excess air in the combustion gases. The amount of excess air is within the control of the operator, and this excess air should be kept to a minimum or be totally eliminated, even at the expense of some loss of efficiency in combustion of fuel.

In Figure 2 I have shown the conduit 31 with the nozzle 39 pointing directly downward. In some cases it may be more advantageous to rotate the conduit 31 counter-clockwise about 45°, the actual position being chosen to put the spray of asphalt on the material-in-process and to keep it away from the shell of kiln 1.

The combustion gases from the burner 6, together with distilled-off volatile matter, pass out of the upper end of the kiln into stack 3 and discharge to the atmosphere.

The material prepared in kiln 1 is finally discharged over the flange 7 at the lower end of the kiln into receiving bin 9, this bin being separated from furnace chamber 2 by means of wall 10. At this stage this material is aptly termed aggregate. From bin 9 the aggregate is conducted to other apparatus for further processing. Passage of aggregate from bin 9 to chute 11 is controlled by gate 29. From this point the product can be elevated by elevator 12 and discharged through chute 13 into apparatus for further processing.

The description of my apparatus, up to this point, is directed to one in which the flow of the material-in-process and of the combustion gases is countercurrent. However, one modification of my apparatus can, with equal effectiveness and advantage, be operated with the material-in-process and the combustion gases flowing in the same direction. This modification of my apparatus is shown in Figure 5, which has already been described. When, as in Figure 5, the furnace is positioned at the higher end of the kiln and the material-in-process and the combustion gases flow in the same direction, it is possible to get the ore to a substantially elevated temperature in very short travel and to then apply the asphalt to the ore at a temperature conducive to prompt saturation and coking. In this modification of our apparatus there is substantially less chance of forming a sticky mass that will adhere to the wall of the kiln and temporarily fail to move horizontally lengthwise thereof.

The following is a specific example of an operation using my apparatus:

A horizontal rotary kiln such as hereinbefore described was charged with 2800 pounds per hour of bauxite containing 32.7% $H_2O$, and through conduits 33 to 37 inclusive and nozzles 39, with 3300 pounds per hour of west Texas pitch. The bauxite, on a water-free basis, analysed as follows:

| | Percent by weight |
|---|---|
| $Al_2O_3$ | 90.8 |
| $TiO_2$ | 1.7 |
| $SiO_2$ | 4.5 |
| $Fe_2O_3$ | 1.0 |

The west Texas pitch had the following properties:

| | | |
|---|---|---|
| Specific gravity, 60° F./60° F. | | .9965 |
| Softening point (ASTM D36) | ° F | 88 |
| Sulfur | wt. percent | 2.26 |
| Fixed carbon | wt. percent | 16.76 |
| Distillation: | | |
| I. B. P. | ° F | 426 |
| 2% overhead | ° F | 619 |
| 5% overhead | ° F | 949 |
| 10% overhead | ° F | 986 |
| 20% overhead | ° F | above 1000 |

The aggregate was prepared in a horizontal rotary kiln having a length of sixty feet and a diameter of six feet. The slope of the kiln and the rate of feed of bauxite were such as to give a residence time of the material in the kiln of seventy-five minutes. The bauxite was heated therein without asphalt in the first five feet of travel, and at five feet from the entrance it received its first spray of liquid asphalt. Four additional sprays of asphalt were charged to the material-in-process, these sprays being positioned at distances of twenty feet, thirty-three feet, forty-four feet, and fifty-three feet from the point at which bauxite entered, the last of those points being seven feet from the discharge end of the kiln. The asphalt completely penetrated the bauxite and, with a furnace chamber temperature of 1900° F. and with gases leaving the kiln at a temperature of 700° F., each increment of asphalt was well carbonized before the addition of the next increment. The fully carbonized aggregate discharged from the kiln contained sixty pounds of carbon per hundred pounds of oxygen in the ore, and the burn-off in the kiln was approximately four percent. This burn-off of carbon is, of course, in addition to the distilled-off volatile matter. The residence time of the material in the kiln was approximately 75 minutes.

The aggregate left the kiln at a temperature of 1635° F. and, at a temperature of 1470° F., was charged into a chlorination retort. Dry chlorine gas at atmospheric temperature was charged to the retort and the chlorination reaction proceeded smoothly and rapidly at an unprecedentedly low temperature. The anhydrous aluminum chloride was condensed and separately collected.

This apparatus is highly advantageous not only for preparing aggregates of highly porous oxides and carbon, but also for preparing aggregates of non-porous oxides and carbon, e. g. titanium sands, boron compounds, etc. These aggregates of non-porous oxides with coked asphalt have been found in all cases to be more reactive than ordinary mechanical mixtures of such oxides with carbon, and also more reactive than briquettes of finely divided oxide and carbon.

Various uses of this apparatus are set forth in extensive detail in a series of applications filed on the same day as this application, in my name jointly with other parties and identified as follows:

Application Serial No. 477,346 filed December 23, 1954 by O. L. Culberson and W. A. Pardee, entitled Carbon Impregnated Solids and Method of Preparing the Same.

Application Serial No. 477,248 filed December 23, 1954 by O. L. Culberson and W. A. Pardee, entitled Manufacture of Anhydrous Aluminum Chloride.

Application Serial No. 477,304 filed December 23, 1954 by W. A. Pardee, entitled Manufacture of Phosphoric Acid.

Application Serial No. 477,266 filed December 23, 1954 by C. W. Montgomery and W. A. Pardee, entitled Aggregates of Boron Compounds and Carbon and Method of Preparing the Same.

Application Serial No. 477,247 filed December 23, 1954 by W. A. Pardee, entitled Utilization of Anhydrous Aluminum Chloride Sludge.

In this specification and the appended claims the term "horizontal rotary kiln" is used to designate the type of kiln commonly known by that designation, notwithstanding the fact that such kilns are in fact inclined kilns having the charging end elevated somewhat above the discharge end.

I claim:

1. An apparatus for preparing carbon-impregnated solids which comprises: a horizontal rotary kiln and a means for rotating the same; a furnace positioned at one end of said horizontal rotary kiln and adapted to heat the same; a heating means in said furnace; a stack and a connection thereinto from the end of the said horizontal rotary kiln opposite the end at which said furnace is positioned; means for charging discrete solid material into the said horizontal rotary kiln at the elevated end thereof; a receiving chamber in communication with the lower end of the said horizontal rotary kiln, positioned to receive material discharged from said kiln; an insulated conduit within said kiln and extending lengthwise thereof; a series of orifices in the wall of the said insulated conduit and in the surrounding insulation thereof, said orifices being at spaced intervals along the length of said insulated conduit; a plurality of smaller conduits positioned inside of the said insulated conduit, each of said smaller conduits being connected at one end to one of said orifices, extending from such orifice to an extremity of said insulated conduit, and adapted to be connected at such extremity to a source of fluid supply; and means for introducing into and removing from the said insulated conduit a temperature controlling fluid.

2. The apparatus of claim 1, in which a series of nozzles extend outwardly from the said series of orifices in the wall of the said insulated conduit through the insulation and into the said kiln.

3. An apparatus which comprises: a horizontal rotary kiln and a means for rotating the same; a means for introducing heat into the kiln at one end thereof and means for removing combustion gases from the opposite end thereof; means for charging discrete solid material into the said horizontal rotary kiln at the elevated end thereof; a receiving chamber in communication with the lower end of the said horizontal rotary kiln, positioned to receive material discharged from said kiln; a conduit positioned within said horizontal rotary kiln, removed from the bottom thereof, and extending the full length thereof; heat insulation surrounding said conduit; a series of orifices through the wall of said conduit and through the insulation thereof, said orifices being positioned at spaced intervals along the length of said conduit; a plurality of smaller conduits positioned inside of the first-mentioned conduit, each of said smaller conduits being connected at one end to one of said orifices, extending from such orifice to an extremity of the first-mentioned conduit, and adapted to be connected at such extremity to a source of fluid supply; and means for introducing into and removing from the first-mentioned conduit a temperature controlling fluid.

4. The apparatus of claim 3, in which a series of nozzles extend outwardly from the said series of orifices in the wall of the said insulated conduit through the insulation and into the said kiln.

References Cited in the file of this patent

UNITED STATES PATENTS

| | | |
|---|---|---|
| 1,446,857 | Pieter | Feb. 27, 1923 |
| 1,538,490 | Randall | May 19, 1925 |
| 1,562,550 | Hall | Nov. 24, 1925 |
| 1,992,549 | Short et al. | Feb. 26, 1935 |
| 2,642,273 | Dube | June 16, 1953 |
| 2,671,009 | Comstock | Mar. 2, 1954 |